July 9, 1968  K. EBERTS ET AL  3,392,317
APPARATUS FOR CHARGING AN ELECTRICAL ACCUMULATOR
Filed Jan. 15, 1965  8 Sheets-Sheet 4

United States Patent Office 3,392,317
Patented July 9, 1968

3,392,317
APPARATUS FOR CHARGING AN
ELECTRICAL ACCUMULATOR
Klaus Eberts and Gerhard Fischer, Budingen, Upper
Hesse, Germany, assignors to Accumulatorenfabrik
Sonnenschein G.m.b.H., Budingen, Upper Hesse,
Germany, a limited-liability company of Germany
Filed Jan. 15, 1965, Ser. No. 425,795
Claims priority, application Germany, Jan. 18, 1964,
A 45,033
12 Claims. (Cl. 320—23)

ABSTRACT OF THE DISCLOSURE

An accumulator or battery charging device has electronic means for reducing the charging current to the terminals of the accumulator, when the accumulator terminals approach a desired voltage; and it includes both a semi-conductor, which is rendered non-conductive when the charging current falls below a predetermined low value, to cut off the charging current, and control means for restricting the charging current, as it approaches said predetermined low value, thus to maintain a predetermined voltage between said terminals.

---

The present invention relates to an apparatus for charging an electrical accumulator, said apparatus comprising a source of current of constant voltage so chosen that the initial charging current will not exceed a maximum limit, said apparatus being further provided with means which automatically cuts-off substantially the charging current when this current drops below a predetermined limit.

Voltage-responsive systems are known which are used for charging electrical accumulators and control the charging operation in dependence on the voltage of the cell or cells of the accumulator. In each of these prior systems a voltage-responsive switching element is provided to operate one or more mechanical contacts or mercury contacts causing them to insert resistors into the charging circuit for the purpose of reducing the charging current, to produce signals for the indication of the condition of the accumulator or to cut-off the charging current entirely. Where the accumulator is of small size or has sealed cells, it is particularly important for known reasons that the charging current be either completely cut-off or reduced to a small trickling current sufficient to maintain the charged condition.

The systems including mechanical switches or mercury switches have various disadvantages such as unreliability of the operation of the switch contacts after extended period of operation owing to wear phenomena, such as migration of material, and are thus susceptible to faulty operation caused by vibration, by dependency on the temperature of the surroundings, particularly where switches are operated by heat produced by current and, where mercury switches are used, by the dependency upon the position of the apparatus. For all of these reasons, it is difficult to reliably ensure that the charging current is cut-off in exact dependency on the measured parameter. Experience has shown in practical operation that the condition of the accumulator upon automatic termination of the charging operation is subject to large variations. Thus for instance a change by 2–3% only of the measured parameter results in a considerable variation of the instant, when the charging current is cut-off with the result that the charging operation is either terminated prematurely or that the accumulator is overcharged beyond the admissible capacity. In either case the accumulator is damaged and its lifetime reduced.

It is the object of the invention to avoid these difficulties.

The invention relates to an apparatus for charging an electrical accumulator comprising a soure of direct current, a pair of terminals for connection to the accumulator and an electrical circuit including said source and said terminals for conducting the charging current. According to the present invention this apparatus is provided with electronic means connected with said circuit and responsive to the charging current flowing therein for abruptly drastically reducing said charging current, when the same decreases below a predetermined limit, and also operative, when said charging current approaches said limit to restrict said charging current to a value ensuring maintenance of a predetermined voltage between said terminals.

This electronic means may include at least one semiconductor of the type having a continuously variable resistance and control means comprising a first means so connected to said circuit as to respond to the decrease of said charging current below a predetermined limit by producing a control voltage which abruptly increases said resistance, and a second means operative, when said charging current approaches said limit to restrict said charging current to a value ensuring maintenance of a predetermined voltage between said terminals.

In another embodiment of the invention the electronic means include at least one semi-conductor of the type which has a resistance variable discontinuously between a relatively high resistance value and a relatively low resistance value and changes its resistance condition in response to an initial control voltage. In this embodiment the means for producing said control voltage comprise a first means operative upon completion of said circuit to impart said low resistance to that semi-conductor to thereby initiate said charging current, and a second semiconductor operative, when said charging curent approaches said limit to restrict said charging current to a value ensuring a predetermined voltage between said terminals.

Owing to this design of the charging apparatus the charging current will not be cut-off until the charging current flowing through the accumulator has reached a predetermined lower limit or drops therebelow. Moreover the charging voltage applied to the terminals connected to the accumulator is adjusted to a value corresponding to the predetermined final value of the charging voltage. The source of direct current producing a constant voltage is so dimensioned that the initial charging current will not increase beyond a permissible maximum limit.

For the attainment of this object, according to the invention there is either provided known stabilizing means including a Zener diode and a preceding resistor or, in lieu of the Zener diode a series of rectifier diodes disposed in current flowing direction, these diodes being able to stabilize a low voltage as required for charging an accumulator comprising a single cell. This voltage is too low to permit stabilization by Zener diodes.

In another embodiment of the present invention in which the semi-resistor of the type having a continuously variable resistance is formed by a transistor, the collector-emitter-passage of this transistor is inserted in the charging circuit, this transistor being controlled in dependence on the voltage of the accumulator by a Zener diode or by a series of diodes.

This semi-conductor serving the purpose of abruptly reducing the charging current to zero or nearly to zero, when the accumulator reaches the charged condition, is also operative during the charging operation to control the charging current, or the charging voltage respectively. With the aid of a bistable device operating in dependence on the charging current the control voltage is so changed, when the bistable device changes its state abruptly, that the transistor's comparatively low resistance controlled by the Zener diode is abruptly increased to a limit which will interrupt the charging current or reduce it to a low limit sufficient to compensate self-discharge of the accumulator.

In the embodiment of the invention in which the semiconductor is of the type which has a resistance variable discontinuously between a relatively high value and a relatively low value, this semi-conductor may be formed by a four-layer diode or by a controlled rectifier. For the purpose of initiating the current flow through these semi-conductors, the control voltage applied thereto must be higher than the voltage required in normal operation. This high initiating voltage can be obtained in accordance with the invention by a R-C-unit supplied with current either from a power line directly by means of a voltage divider or supplied with current from a second secondary winding of the transformer connected to the power line or may be supplied with current from the secondary transformer winding supplying the charging current with the aid of a voltage duplicating circuit. In this latter case the normal charging rectifier and the smoothing condenser constitute the first stage of the duplicating circuit. The R-C unit serves the purpose of delaying the application of the initiating voltage to the semi-conductor relatively to the charging voltage. In event of a semi-automatic operation of the apparatus the initiating voltage can be applied to the semi-conductor in accordance with the invention by a mechanical press button switch. In event a controlled rectifier is used as the semi-conductor substantially cutting off the charging current, the initiating voltage is applied to the control terminal of this rectifier. The charging current is cut-off by the change of the semi-conductor to its high-resistance state. The semi-conductor passes abruptly into this state, when the charging current having fully charged the accumulator dereasaes to a predetermined lower limit being then unable to keep the semi-conductor in its highly conductive state. Although the minimum current maintaining a semi-conductor of this type in its conductive state is a fixed parameter characteristic of any particular semi-conductor, the lower limit of the charging current can be adjusted so as to meet the requirements by shunting a resistor across the semi-conductor or across the accumulator.

Various embodiments of the invention will now be described with reference to the accompanying drawings in which.

Figure 1:
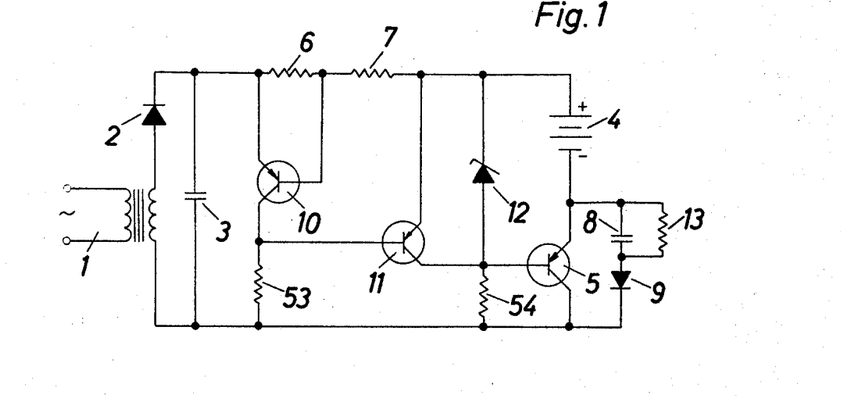
FIGURES 1–16 illustrate the circuit diagrams of various apparatus for charging an electrical accumulator in accordance with the present invention.

The apparatus having an electrical circuit system as diagrammatically shown in FIGURE 1 includes a transformer 1 comprising a primary winding adapted to be connected with a source of alternating current such as electrical power line or main and having a secondary winding. The electrical circuit including this secondary winding further includes a rectifier 2, resistors 6 and 7, a pair of terminals for connection therebetween of the accumulator 4 and the emitter and collector of a transistor 5. The direct current flowing through this circuit as long as the semi-conductor formed by transistor 5 is in its conductive state, is smoothened by a condenser 3 having one of its terminals connected to the circuit between the rectifier 2 and the resistor 6 and having its other terminal connected to the end of the secondary transformer winding remote from the rectifier 2. The charging circuit is preferably closed by a switch connecting the primary winding of transformer 1 to the power line.

Moreover, there is provided a bistable device connected across resistor 6 and comprising transistors 10 and 11. Transistor 10 has its emitter connected to the circuit between the rectifier 2 and the resistor 6, whereas the collector of transistor 10 is connected to the base of transistor 11 and to a resistor 53 which in its turn is connected to the collector of transistor 5. The emitter of transistor 11 is connected to the circuit between resistor 7 and the accumulator 4 and the collector of transistor 11 is connected to the base of transistor 5. Moreover, a Zener diode 12 is connected between the base of transistor 5 and a point of the circuit located between resistor 7 and the accumulator 4. A resistor 54 connects the base and the collector of transistor 5. The transistor 5 is by-passed by a branchline connecting its emitter and its collector. In this branchline there is inserted a condenser 8 and a rectifier 9. A resistor 13 is shunted across the condenser 8.

The operation of this apparatus will now be described. When the primary winding of transformer 1 is connected to the power line to complete the circuit, a direct voltage is applied to condenser 3 by the rectifier 2. The voltage is also applied to the starting condenser 8. Therefore, a current charging this condenser 8 will flow through the resistors 6 and 7 and through the battery even though initially the semiconductor 5 is in its state of zero conductivity. During the short period of time in which the condenser 8 is charged, the current flowing through resistor 6 produces different potentials on the terminals of resistor 6 and, therefore, a higher potential on the emitter than on the base of transistor 10. Therefore, transistor 10 will become conductive permitting a current to flow through resistor 53. Consequently, a higher potential will be applied to the base of transistor 11 than to its emitter, whereby transistor 11 will become non-conductive. With the bistable device in this state, the negative voltage applied to the base of transistor 5 renders it conductive and a current will flow within the main circuit from secondary transformer winding through rectifier 2, resistors 6 and 7, accumulator 4, transistor 5 (which in this state of the bistable device is in its conductive condition) and back to the secondary transformer winding. The value of this charging current depends on the characteristics of the transformer and of the rectifier 2, on the combined resistance of resistors 6 and 7, and on the counter-voltage of the accumulator 4. This current charges the accumulator gradually increasing the counter-voltage thereof. At the end of this first stage of the charging operation, this counter-voltage will reach a limit causing the Zener diode 12 to become conductive. As a result, the potential of the base of transistor 5 will rise and will reduce the conductivity of transistor 5 in the second stage of the charging operation, whereby the charging current will be restricted, and will effect a corresponding restriction of the voltage between the terminals of the accumulator 4 to the required value. Hence, the Zener diode cooperating with the transistor 5 acts as a voltage controller, since any undue increase of the potential difference between the terminals of accumulator 4 above a predetermined value will increase the current flowing through Zener diode 12 and resistor 54 thereby increasing the potential of the base of transistor 5. Consequently, the resistance between emitter and collector of transistor 5 will increase so as to reduce the charging current keeping the charging voltage substantially constant.

This charging voltage is thus adjusted at a constant limit corresponding to the value thereof permissible in the second stage of the charging operation.

Under the effect of the constant charging voltage applied to the terminals of the accumulator 4 the charging current will decrease gradually. The voltage drop across the resistor 6 decreases in proportion thereto until it reaches a lower limit in which it is no longer able to keep the bistable device in its state. At this instant, the bistable device will pass into its other state in which transistor 10 becomes non-conductive thus applying the negative potential through resistor 53 to the base of transistor 11 rendering the latter conductive. This will apply a positive control voltage to the base of transistor 5 whereby the resistance of transistor 5 is abruptly increased to a value cutting off the charging current flowing therethrough.

The resistor 6 is so chosen in dependence on the capacity of accumulator 4 that the transition of the bistable device to its other state occurs exactly at the instant when the accumulator 4 has been fully charged.

In the other state of the bistable device in which the charging current has been cut off, transistor 11 is in its conductive state whereas transistor 10 is blocked.

From the above it will be understood that during the second stage of the charging operation the control voltage applied to the base of transistor 5 is determined by the Zener diode 12 and by the base resistor 54 and that after attainment of the loaded condition of the accumulator 4 with the bistable device in its other state the control voltage is applied to the base of transistor 5 by the connection thereof with the positive terminal of accumulator 4 through transistor 11, this control voltage, therefore, blocking transistor 5.

After the current flowing from the negative terminal of accumulator 4 through transistor 5 has been cut-off, the voltage of the loaded accumulator 4 decreases to its open value. This drop of voltage, however, does not affect the bistable device which remains in its other state, provided that the current flowing through transistor 11 is smaller than the charging current at the instant when it is cut-off by transistor 5. If this condition is complied with, the voltage drop in resistor 6 remains so low that it will not render transistor 10 conductive. Therefore, the value of the charging current at the instant of its interruption by transistor 5 is determined by the resistance of resistor 6.

The resistor 13 shunted across the condenser 8 serves the purpose of slowly discharging this condenser to thereby bring the apparatus in condition for renewed operation.

After the accumulator 4 has been charged, it may be disconnected from the pair of contacts included in the main circuit and the primary winding of transformer 1 may be disconnected from the power line. If desired, however, the charging apparatus may be left in connection with the accumulator. Owing to the disconnection of the transformer 1 from the power line, however, a very small discharge current could flow through the accumulator in the absence of special provisions. For the purpose of blocking such discharge current, the rectifier 9 is provided.

For the purpose of preventing self-discharge of accumulator 4, the charging apparatus may be left connected to the power line and to the accumulator 4 and a small resistor may be shunted across the collector and emitter of transistor 5 thus maintaining a low trickle current through accumulator 4 which will prevent self-discharge thereof.

It is characteristic of the present invention that the elements 5, 6, 7, 10, 11, 12, 53 and 54 constitute electronic means which are connected with the circuit and respond to the charging current flowing therein by abruptly drastically reducing the charging current, when the same decreases below its predetermined cut-off limit. These electronic means are also operative, when the charging current approaches the cut-off limit, to restrict the charging current to a value ensuring a predetermined voltage between the terminals of the battery 4.

More specifically, the electronic means include at least one semi-conductor of the type having a continuously variable resistance, which semi-conductor in FIGURE 1 is formed by the transistor 5.

The bistable device 10, 11 represents a first means connected to the circuit so as to respond to the decrease of the charging current below its cut-off limit. The response resides in producing a control voltage which changes the bistable device to its other state and thereby abruptly increases the resistance of transitsor 5. The Zener diode 12 represents a second means operative, when the charging current approaches the cut-off limit to restrict the charging current to a value ensuring maintenance of a predetermined voltage between the terminals of accumulator 4. The condenser 8 represents means connected to the circuit and temporarily operative upon completion of the circuit to by-pass transistor 5 to thereby initiate a current in the circuit. This current will shift the bistable device to the condition rendering transistor 5 conductive.

Figure 2:
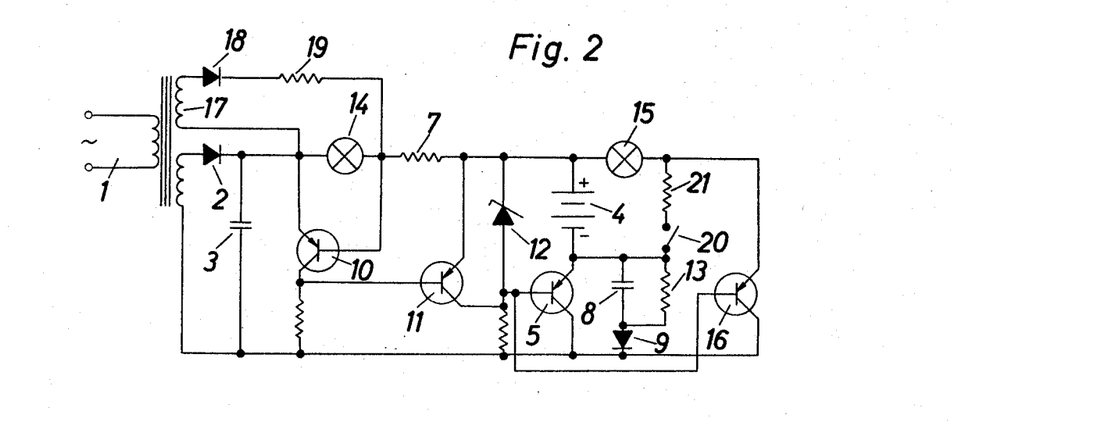

In the embodiment of the present invention illustrated in FIGURE 2 the resistor 6 has been replaced by an indicating bulb 14. This bulb burns during the first phase of the charging operation and will be dimmed as soon as the Zener diode 12 becomes conductive and causes transistor 5 to reduce the charging current and to keep the charging voltage constant. When this occurs, accumulator 4 has been charged up to about 90% of its nominal capacity.

It is desirable to also indicate the second phase of the charging operation in which the charging current has been greatly decreased by transistor 5. For this purpose a second indicating bulb 15 is provided for operation by the emitter current of an additional fourth transistor 16. The emitter of transistor 16 is connected via the indicator bulb 15 to the positive terminal of the accumulator, whereas the base of transistor 16 is directly connected to the base of transistor 5 and, similarly, the collector of transistor 16 is directly connected to the collector of transistor 5. Transistor 16 will so control bulb 15 as not to dim it until transistor 5 is blocked by the bistable device 10, 11.

In order to render the shifting operation of the bistable device even more accurate, an auxiliary voltage is applied to the indicating bulb 14, such auxiliary voltage having a polarity opposite to that of the charging current. This auxiliary voltage is produced by a second secondary winding 17 of transformer 1 in cooperation with a rectifier 18. A resistor 19 arranged in series with rectifier 18 will so determine the auxiliary voltage that the voltage measured between the terminals of bulb 14 is reversed, when the charging current drops to its cut-off value. The reversal of the voltage measured between the terminals of bulb 14 changes the bistable device to its other state. In this manner the instant of such changes is more definitely determined.

When an accumulator is in an extremely discharged condition, it has a very high internal resistance. If accumulator 4 is in that condition, a very small charging current only would flow through bulb 14 upon connection of the primary winding of transformer 1 to the power line. This current may be possibly below the cut-off limit, and therefore, would be insufficient to shift the bistable device to its first state in which transistor 5 is conductive. Therefore, a manually operable press button switch 20 is so provided that it may shunt a resistor 21 across the accumulator 4 and bulb 15. If desired, resistor 21 may be replaced by any current-consuming apparatus. Switch 20 is manually closed temporarily until the internal resistance of accumulator 4 has dropped to a normal value. This will be indicated by bulb 14 upon release of the press button switch 20.

Figure 3:
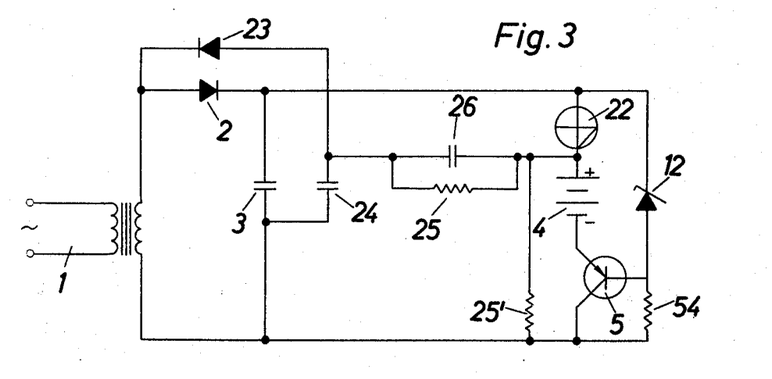

The embodiment illustrated in FIG. 3 differs from those described hereinabove primarily by the type of the semi-conductor included in the main charging circuit. Whereas in the embodiments of the invention described hereinabove the transistor 5 represents a semi-conductor of the type having a continuously variable resistance, the semi-conductor 22 in FIG. 3 is of the type which has a resistance variable discontinuously between a relatively high resistance value and a relatively low resistance value and changes its resistance condition in response to an initiate control voltage. This semi-conductor 22 may be formed, for instance, by a four layer diode of the Shockley type. In this embodiment the transistor 5 serves the sole purpose of controlling the charging current during the second stage of the charging operation. For this purpose, transistor 5 is controlled by the Zener diode 12 and the resistor 54 just as in FIGS. 1 and 2. The elements 1, 2 and 3 are the same as those shown in FIGS. 1 and 2, and, therefore, need not be described. The semi-conductor 22 is connected in series with the accumulator 4 and the emitter of transistor 5.

When the operation is initiated by connection of the primary winding of transformer 1 to the power line, the four-layer diode 22 is still in its state of high resistance and, therefore, blocks the flow of charging current through the accumulator 4. A temporary high initial control voltage must be applied to diode 22 for the purpose of changing its state. Before this happens, however, the smoothing condenser 3 must be charged. For this reason, the high initial voltage impulse must be delayed by a short interval, after condenser 3 has been connected to the power line. For producing this high initial voltage impulse an auxiliary source of voltage higher than that of the source of direct current and a R-C unit 25, 25', 26 connecting this auxiliary source to the semi-conductor 22 are provided. The condenser 26 forming part of the R-C unit is shunted by the resistor 25 of such a magnitude as to permit passage of the current substantially not larger than the current flowing through the semi-conductor 22, when the latter is in its condition of high resistance. The auxiliary source of current is formed by a second rectifier 23 and by a second condenser 24 which are so connected with the secondary winding of transformer 1 as to produce an auxiliary voltage twice that existing between the terminals of condenser 3. As will appear from FIG. 3 the rectifier 23 and the condenser 24 are arranged in series between the terminals of the secondary transformer winding, and the R-C unit 25, 26 is connected between a point located between semi-conductor 22 and accumulator 4 and a point located between rectifier 23 and condenser 24.

The operation is as follows: After transformer 1 has been connected to the power line, the condenser 26 will be charged with the high auxiliary DC voltage. When the time required for charging this condenser has expired, the full high auxiliary voltage will act on the terminals of diode 22 via resistor 25 and will shift the semi-conductor 22 to its highly conductive state, whereupon this semi-conductor will conduct the charging current through accumulator 4. During the first phase of the charging operation transistor 5 is fully conductive permitting the full charging current to flow until accumulator 4 will have been charged to about 90% of its capacity. When this condition has been reached, the voltage of accumulator 4 will have risen to such a level as to cause Zener diode 12 to permit passage of current through resistor 54. This will raise the potential of the base of transistor 5 causing this transistor to restrict the charging current during the second stage of the charging operation in the manner described hereinabove with reference to FIGS. 1 and 2. During this second stage the restricted charging current drops slowly until it reaches the cut-off limit. At this instant, the four-layer diode 22 automatically passes into its state of high resistance thus cutting off the charging current or, strictly speaking, reducing it to a very low value just sufficient to keep condenser 26 charged. Therefore, this condition will be maintained until transformer 1 is disconnected from the power line permitting condenser 26 to be discharged. The charging apparatus is then ready for the next charging operation.

In this embodiment shown in FIGURE 3 the elements 5, 12, 22, 25, 25', 26 and 54 constitute the electronic means which are connected with the charging circuit and respond to the charging current by abruptly and drastically reducing the latter, when the same decreases below its cut-off value. These electronic means are also operative, when the charging current approaches its cut-off limit, to restrict the charging current to a value ensuring maintainance of a predetermined voltage between the terminals of accumulator 4. More particularly, the electronic means include at least one semi-conductor 22 of the type which has a resistance variable discontinuously in the manner described hereinabove. This semi-conductor changes its resistance condition in response to the initial control means 23, 25, 25', 26 which are provided for producing the initial control voltage and operate upon completion of the charging circuit to impart the low resistance to the semi-conductor 22. The second semi-conductor 5 is operative when the charging current approaches the cut-off limit, to restrict the charging current in the manner described hereinabove so as to maintain a predetermined voltage between the terminals of the accumulator.

In lieu of a four-layer diode other semi-conductors of the type having a discontinuously variable resistance may be used such as a controlled rectifier provided with a third terminal for application of the initial control voltage rendering the rectifier conductive. As the control voltage is a D.C. voltage, it needs to be applied but once for any charging operation.

In the embodiment shown in FIG. 3 the charging voltage applied to the accumulator in the second stage of the charging operation amounts to the critical voltage rendering the Zener diode 12 conductive minus the voltage drop between the terminals of the semi-conductor 22. As this voltage drop is typical of any particular semi-conductor and may differ for different semi-conductors considerably, also depending on the current, this semi-conductor 22 may be interposed in the charging circuit at some other point so as not to be shunted by the Zener diode 12. In such case, the voltage applied to the Zener diode corresponds directly to the charging voltage applied at the end of the second stage of the charging operation.

Figure 4:
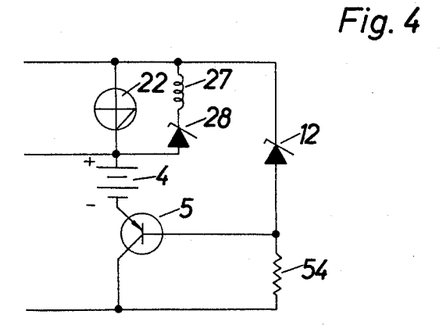

FIG. 4 shown a charging system differing from that illustrated in FIG. 3 by the additional provision of an inductance 27 and a second Zener diode 28 arranged in series and shunted across the semi-conductor 22. After the four-layer diode 22 has changed to its state of high resistance, when the accumulator 4 has been fully charged, the additional elements 27 and 28 will become effective to maintain across accumulator 4 a constant floating voltage with which the accumulator is compatible, such voltage being just high enough to prevent self-discharge of the accumulator. For this purpose the Zener diode 28 is so chosen with respect to the four-layer diode 22 that the critical voltage of the Zener diode 28, rendering the same conductive, corresponds to the difference between the normal constant charging voltage and said floating voltage. The inductance 27 is required in order to enable the high initial voltage impulse to be applied to the four-layer diode 22 for the purpose of changing its state to that of lower resistance. Where semi-conductor 22 is formed by a controlled rectifier having a separate third electrode for the application of the high initial voltage impulse, the inductance 27 may be omitted.

Figure 5:
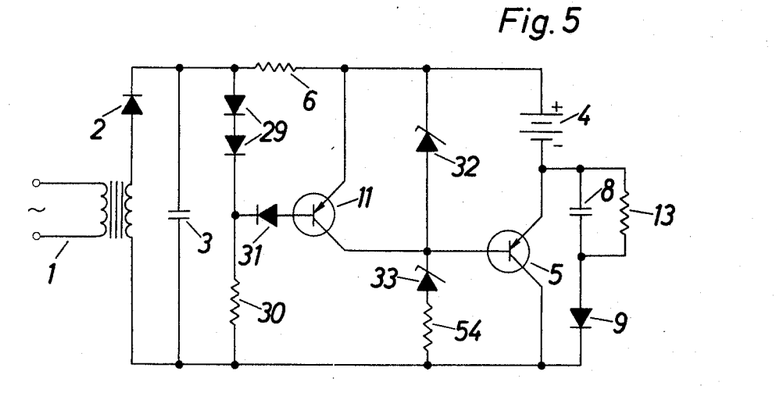

The embodiment illustrated in FIG. 5 differs from that of FIG. 1 by the structure of the bistable device. In FIG. 5 resistor 7 has been omitted and the transistor 10 and the resistor 53 have been replaced by elements 29, 30 and 31. In this embodiment transistor 5 forms part of the bistable device. The element 29 is formed by a pair of rectifiers arranged in series and cooperating with resistor 30 to form a voltage divider. A point located between the rectifiers 29 and the resistor 30 is connected with the base of the transistor 11 by means of a blocking rectifier diode 31. The emitter of transistor 11 is connected to a point of the circuit located between the positive terminal of accumulater 4 and resistor 6. During the first stage of the charging operation transistor 11 is in its non-conductive state thus permitting a negative voltage to be applied to the base of transistor 5 via resistor 54 and a Zener diode 33. When the charging current in the course of its decrease in the second stage of the charging operation reaches the critical cut-off limit, the emitter potential applied to transistor 11 will rise above the potential applied to its base by the voltage divider 29, 30 and, as a result, conductor 11 will become conductive and will block transistor 5 thus cutting off the charging current. Moreover, the circuit system of FIG. 5 differs from that of FIG. 1 by the substitution of a pair of Zener diodes 32, 33 for the single Zener diode 12. Just as in the case of FIG. 1 the Zener diodes 32 and 33 will so control transistor 5 during the second stage of the charging operation as to keep the charging voltage substantially constant. After the charging current has been cut-off, the Zener diode 33 will so reduce the potential of the base of transistor 5 as to permit passage therethrough of a low floating current just sufficient to prevent self-discharge of battery 4.

Figure 6:
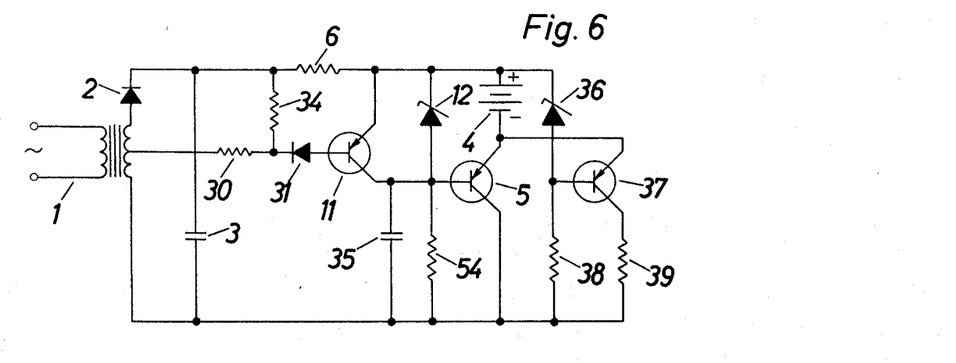

In FIG. 6 we have shown an embodiment of the invention in which the voltage divider 29, 30 of FIG. 5 has been replaced by a voltage divider 30, 34 connected to a tap of the secondary transformer winding. Moreover, the voltage divider element 34 is a resistor in this embodiment. The provision of a series of rectifier diodes 29 in lieu of a resistor 34, however, has the advantage of rendering the voltage drop independent of the voltage of the power line.

Moreover, FIG. 6 differs from FIG. 5 by the omission of condenser 8 and resistor 13. The initial current flow required upon connection of transformer 1 to the power line for the purpose of rendering transistor 5 conductive is obtained in this embodiment of FIG. 6 by the provision of a condenser 35 interposed between the collector of the transistor 11 and the negative terminal of the source of current. When the circuit is completed by connecting the primary winding of transformer 1 to the power line, transistor 11 is conductive and permits a charging current to flow through condenser 35.

When the charging current drops below its cut-off limit, the transistor 5 passes into its non-conductive state. In order to prevent self-discharge of accumulator 4, a floating voltage is applied thereto. For this purpose a third transistor 37 has its base connected with the positive terminal of accumulator 4 by a Zener diode 36 and with the collector of transistor 5 by a resistor 38. The emitter of transistor 37 is connected with the negative terminal of accumulator 4 and the collector of transistor 37 is connected with the negative terminal of the source of current by a resistor 39.

Figure 7:
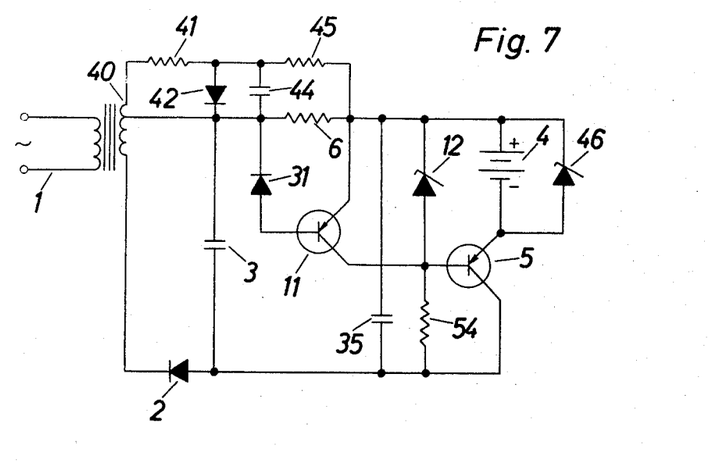

The embodiment illustrated in FIG. 7 is similar to that shown in FIG. 6. Other means than in FIG. 6, however, are provided for reversing the voltage controlling transistor 11. The means used for this purpose in FIG. 7 are similar to those of FIG. 2. The auxiliary source of voltage higher than that measured between the terminals of the smoothing condenser 3 is produced by the end section 40 of the secondary winding. Condenser 3 and rectifying diode 2 are connected between one end of this winding and a central tap thereof. A resistor 41 and a rectifier 42 cooperating with a smoothing condenser 44 produce the additional D.C. voltage. Through a resistor 45 this additional voltage is applied to resistor 6 with a polarity opposite to that imparted to resistor 6 by the charging current flowing therethrough. The resistor 6 and the second source of direct current 40–45 are so dimensioned that the potential across the resistor 6 decreases substantially to zero, when the charging current flowing through resistor 6 decreases below the cut-off limit. As a result, transistor 11 is changed to its conductive state and, in its turn, will block transistor 5. In contrast to FIG. 6, the current-initiating condenser 35 is connected between the positive terminal of accumulator 4 and the negative terminal of the source of current 1, 2 and 3.

For the purpose of enabling the circuit system of FIG. 7 to charge an accumulator 4 which is in its deeply discharged condition of high resistance, a Zener diode 46 is shunted across the accumulator 4. This Zener diode is so chosen that its critical Zener voltage is somewhat higher than that of Zener diode 12 controlling the charging operation in its second stage and determining the charging voltage therein. During the first stage of the charging operation the current will initially flow through Zener diode 46 rather than through accumulator 4 because of the high resistance thereof. The current flowing through the two Zener diodes 12 and 46 is well above the cut-off limit. After a short interval the internal resistance of accumulator 4 will have dropped so far that the voltage between the terminals of the accumulator will drop below the critical Zener voltage limit of Zener diode 46 whereby the latter will become substantially non-conductive causing nearly all of the current flowing through transistor 5 to pass through the accumulator 4.

Resistor 54 connecting the base of transistor 5 to the negative terminal of the source of current may be so dimensioned that initially during the first phase of the charging operation it permits the flow of a substantial current through the Zener diode 12, while the battery 4 is still in its deeply discharged state of high resistance. In this event the second Zener diode 46 may be omitted.

Reverting to FIGS. 1 and 5 showing the resistor 13 shunted across the starting condenser 8, it is preferable to elect a transistor 13 of high resistance requiring considerable time for the discharge of condenser 8, after transformer 1 has been disconnected from the power line. Assuming that an automatic resumption of the charging operation is not desired, this arrangement is satisfactory. Alternatively, however, resistor 33 may be of rather low resistance. In this event the charging operation will be automatically resumed after the voltage of the accumulator has decreased a small amount owing to a discharge thereof.

Figure 8:
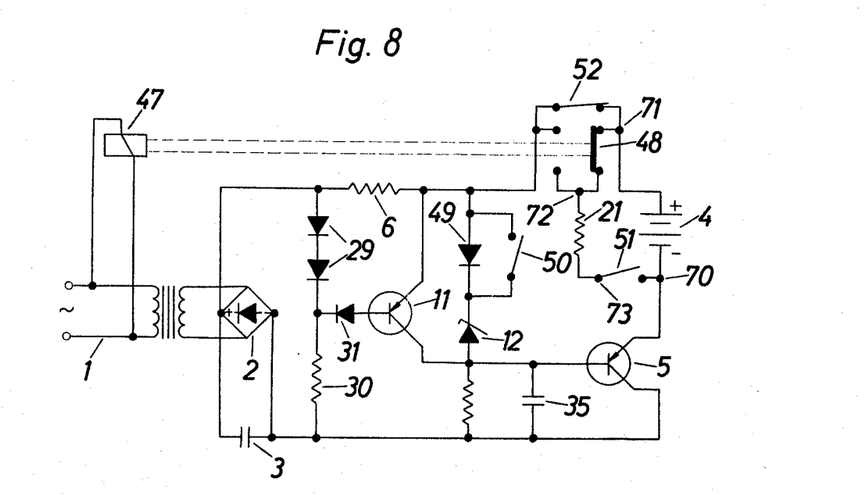

In the embodiment shown in FIG. 8 means are provided to alternatively connect the source of D.C. current formed by transformer 1 and rectifier 2 either to the accumulator 4 for charging the same or to an energy-consuming unit 21. While the accumulator 4 is connected between a first pair of terminals 70, 71, the energy-consuming unit or load 21 is connected between a pair of terminals 72, 73. A multiple contact switch 50, 51, 52 is movable to one or the other of two positions and is so connected to the pairs of terminals 70–73 as to be operative in one position to close a circuit through the source of current 1, 2 and the second pair of terminals 72, 73 and to disconnect a circuit extending through the source of current 1, 2 and the first pair of contacts 70, 71. In its other position shown in FIGURE 8 the multiple contact switch 50–52 connects the circuit through the source of current 1, 2 and the first pair of contacts 70, 71 and disconnects the circuit through the second pair of contacts 72, 73.

The contact 50 of the multiple contact switch 50–52 is shunted across a rectifier 49 arranged in series with the Zener diode 12. Therefore, this contact 50, when closed, activates the Zener diode 12 which constitutes stabilizing means for stabilizing the voltage of the source of current to a relatively low magnitude required for the charging operation.

The apparatus further includes a relay 47 connected to the source of current 1, 2. The contact 48 of this relay moves to its right-hand position shown in FIGURE 8 in event of a failure of the source of power. In this position the relay contact 48 is operative to establish a circuit in which the pair of contacts 70, 71 and the pair of contacts 72, 73 are arranged in series in a closed circuit to thereby cause the accumulator 4 to feed the load constituted by the current-consuming unit 21 connected between the second pair of contacts 72, 73. In the normal operation of the source of current 1, 2 the relay contact 48 assumes its left-hand position in which it connects the source of current to one or the other of the two pairs of contacts 70–73 depending on the position of the multiple contact switch 50–52. When the multiple contact switch is in the position in which contacts 50 and 51 are open and contact 52 is closed, the accumulator-charging operation occurs. The charging operation is interrupted when the multiple contact switch is shifted to the position in which contacts 51 and 50 are closed and contact 42 is open. In this position of the multiple contact switch, energy is supplied by the source of current 1, 2 to the unit 21, the voltage of this current being reduced to the open voltage of the accumulator owing to the fact that rectifier 49 is short-circuited by contact 50.

The accumulator 4 may be an accumulator of a motor vehicle. In this case the source of current is formed by the conventional generator of the motor vehicle.

Means may be provided to indicate the termination of the charging operation or the connection of a constant floating voltage to the charged accumulator to prevent a self-discharge thereof. This will now be described with reference to FIGURE 9 which differs from FIGURE 1 by the characteristics described hereinafter.

Figure 9:
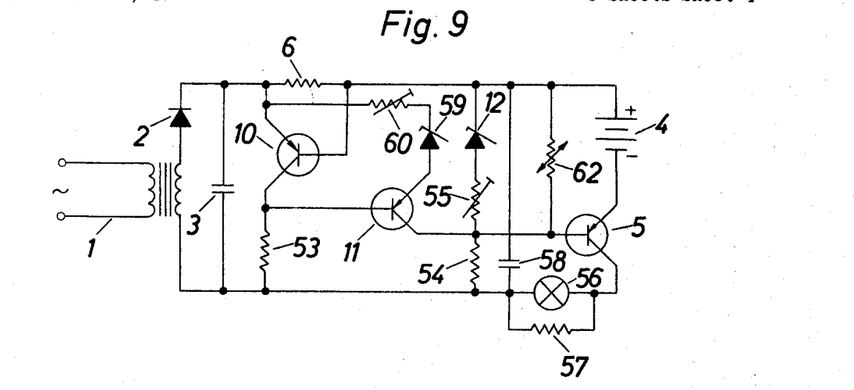

The starting condenser 8 has been replaced by a starting condenser 58 corresponding substantially to the starting condenser 35 shown in FIGURE 7. An indicating bulb 56 is inserted between the collector of transistor 5 and the negative terminal of the source of current 1. A protective resistor 57 is shunted across bulb 56. An adjustable resistor 55 is arranged in series with the Zener diode 12 and permits the critical Zener voltage to be adjusted so as to meet the requirements resulting from the base-emitter-voltage of transistor 5 and the permissible cut-off voltage of accumulator 4. The bulb 56 is dimmed gradually in the course of the second stage of the charging operation in which transistor 5 is caused by the control voltage applied to its base to restrict the charging current. The dimming of the bulb indicates that the accumulator has been charged up to about 80–90% of its nominal capacity.

An adjustable resistor 60 and a Zener diode 59 arranged in series therewith connects the emitter of transistor 11 with the positive terminal of the source of current 1, 2. The resistor 7 of FIGURE 1 has been omitted. It is the function of the elements 59 and 60 to so control transistor 11 that the latter in its turn causes transistor 5 to apply a floating voltage to the accumulator 4 after the charging current therethrough has been drastically reduced. Hence, the control of transistor 5 is effected during the second stage of the charging operation by the Zener diode 12 and the resistor 54 and after conclusion of the charging operation by the Zener diode 59 in cooperation with the resistor 54. Hence, the charging apparatus meets two basic requirements during the charging operation, both of which must be complied with before the charging current will be cut-off or drastically reduced to the value of a floating current preventing self-discharge of the battery. The first requirement is the maintenance of a constant charging voltage between the accumulator terminals during the second stage of the charging operation. The second requirement is the response to a decrease of the charging current below a critical limit, to wit the cut-off limit. When these requirements are met, the accumulator will be completely charged. The floating voltage maintained between the accumulator terminals upon completion of the charging operation is somewhat higher than the normal open voltage of the accumulator and is somewhat lower than a charging voltage which would provoke development of gases in the accumulator. Therefore, the maintenance of the floating voltage preventing self-discharge of the accumulator cannot cause any damage thereto.

The voltage which would provoke development of gases in the accumulator and the characteristics of the semi-conducting elements are subject to variation, when the temperature changes. Therefore, it is desirable to provide additional means ensuring proper operation under extreme temperature conditions. For this purpose, according to another feature of the present invention, the circuit may be equipped with resistors of the type having a resistance varying when the temperature changes. Preferably, these resistors have a negative temperature co-efficient. Such a resistor 62 is shown in FIGURE 9 as being shunted across the unit composed of the Zener diode 12 and of the adjustable resistor 55 connecting the positive terminal of accumulator 4 with the base of transistor 5. Moreover, a resistor 63 having a negative temperature coefficient may be arranged parallel to resistor 6, as shown in FIGURE 10, or may be substituted for resistor 6.

Figure 10:
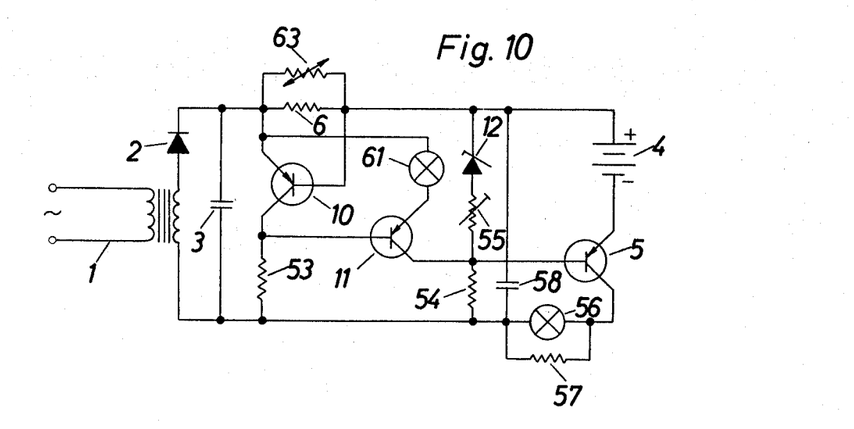
Figure 11:
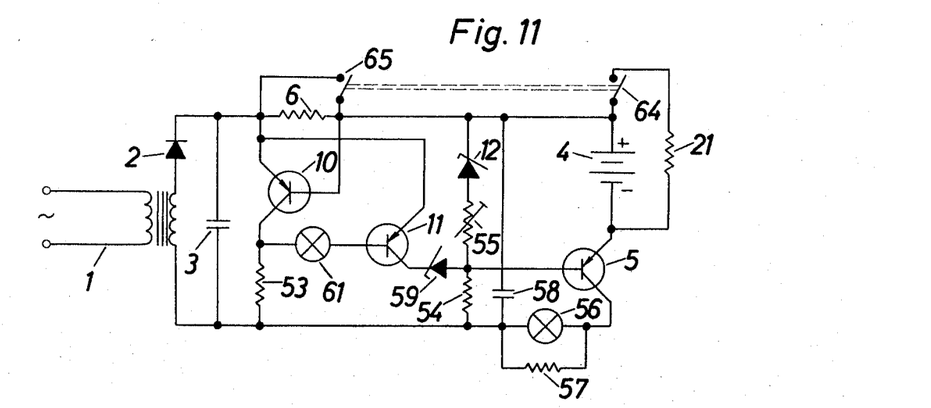

In FIGURE 10 we have illustrated an embodiment of the present invention in which means are provided for indicating the termination of the charging operation coincidental to the change of the state of the bistable device 10, 11. For the purpose of this indication a bulb 61 is inserted in the emitter lead of transistor 11 of the bistable device. The transistor 59 has been omitted from this lead. It may be inserted, however, in the collector lead of transistor 11 as shown in FIGURE 11 for the purpose of determining the floating voltage. Moreover, FIGURE 11 differs from FIGURE 10 by the omission of bulb 61 from the emitter lead and by insertion thereof into the base lead of transistor 11.

In FIGURE 11 an energy-consuming unit or load 21 is diagrammatically represented. It may be connected by a switch 64 in a circuit with the accumulator 4, to be supplied with electrical energy therefrom. As the accumulator is maintained under the floating voltage after having been charged, such floating voltage being higher than the open voltage of the accumulator, the latter is unable to supply current to unit 21. If this current, however, is supplied by the source 1, 2, 3 via resistor 6, the voltage drop in resistor 6 would immediately shift the bistable device 10, 11 and would thus initiate a charging operation which would continue for the entire duration of the time in which unit 21 is connected to the accumulator. In many cases such a charging operation involving the maintenance of a high voltage on the terminals of the accumulator would be undesirable because the unit 21 is liable to be damaged by such high voltage. Therefore, a switch 65 is provided which is so mechanically connected with switch 64 as to short-circuit resistor 6, when the energy-consuming unit 21 is connected by switch 64 to the accumulator. The short-circuiting of resistor 6 has the effect that the charging apparatus will supply the relatively low floating voltage only to the terminals of the accumulator to which unit 21 is connected.

Figure 12:
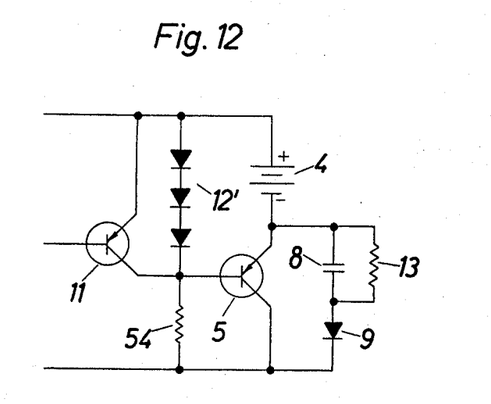
Figure 16:
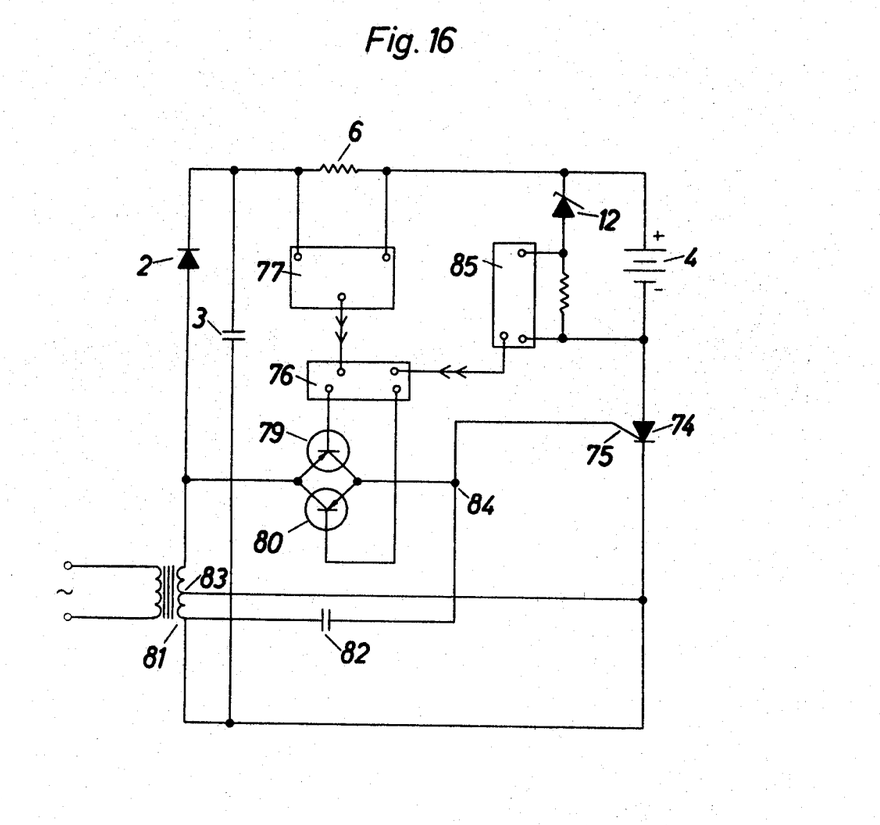

In FIG. 16 the four-layer diode 22 and the transistor 9 shown in FIG. 3 have been replaced by a controlled rectifier 74 having an additional terminal 75 for application of the control voltage thereto which renders this rectifier conductive. When the current flowing through this rectifier drops below a critical holding limit, the rectifier becomes non-conductive. According to another feature of the present invention this controlled semi-conductor rectifier can perform another function in addition to the cutting-off function. This other function is such a control of the charging current as to maintain the two constant voltages required for the operation of the apparatus. This other function requires the provision of a phase-shifting device 79–82 in addition to the bistable device 77 producing the cut-off signal. The phase-shifting device 79–82 is controlled with the aid of unit 76 by the voltage of the accumulator or by the Zener diode 12 controlled by the accumulator voltage. This phase-shifting device supplies the starting impulse to the control terminal 75 of the controlled rectifier. According to this feature of the invention the phase-shifting device comprises a plurality of elements arranged in series, one such element being a source of alternating current, for instance the secondary transformer winding 81, another of such elements being a condenser 82 and a third one being formed by one transistor or by a pair of transistors 79 and 80 connected with opposite polarity. The collector of each of these transistors is connected with the emitter of the other transistor. These transistors 79, 80 are controlled by unit 76 in dependence on the voltage of the terminals of the accumulator. The bistable device 77 and a unit 85 operative during the second stage of the charging operation jointly control unit 76 which produces the voltage applied to the bases of transistors 79 and 80. The input of unit 85 is connected across a resistor arranged in series with the Zener diode 12. As the units 76 and 85 are well known in the art and do not form part of the present invention, they need not be described. The phase-shifted voltage for rendering the controlled rectifier 74 conductive is tapped between a central tap 83 of the source of alternating current and a point 84 located between the condenser 82 and the transistor or transistors 79, 80.

Where the accumulator has a very low voltage consisting for instance of a single cell, the Zener diode 12 can be replaced by a plurality of rectifier diodes connected in series. This is illustrated in FIGURE 12 which is a partial illustration of the circuit system shown in FIGURE 1 modified by substitution of three rectifier diodes 12′ connected in series for the single Zener diode 12. The sum of the forward conducting voltages of the three rectifiers 12′ represents the charging voltage effective in the second stage of the charging operation.

Figure 13:
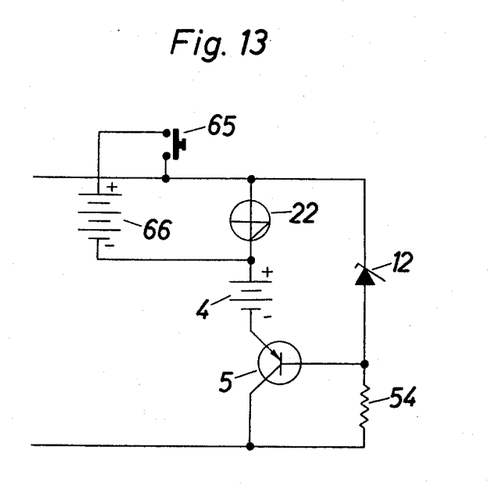

Whereas in FIGURE 3 the initial control voltage imparting the low resistance to the semi-conductor 22 is produced by the R-C unit 25, 25′, 26, this unit has been replaced in FIGURE 13 by a press button switch 65 adapted to be temporarily manually operated for applying the control voltage to the semi-conductor 22. This control voltage is supplied by any suitable source of a high voltage diagrammatically indicated in FIGURE 13 at 66. FIGURE 13 shows the right-hand part of FIGURE 3 modified in this manner.

Figure 14:
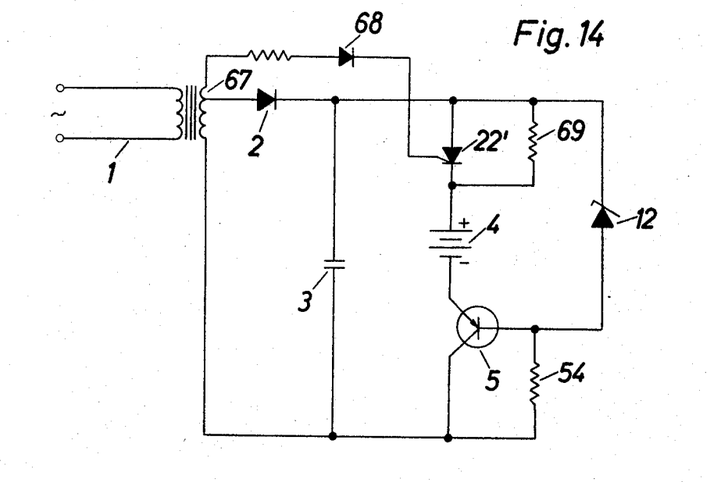

FIGURE 14 illustrates a modification of our invention in which the semi-conductor of the type having a discontinuously variable resistance is a controlled semi-conductor rectifier 22′. In this embodiment the means for producing the control voltage applied to the controlling terminal of diode 22′ is formed by a secondary winding 67 of the transformer 1 and by a rectifier 68 co-ordinated to the secondary winding 67. Moreover, a resistor 69 is shunted across the semi-conductor 22′, for the purpose of increasing the value of the cut-off current.

Figure 15:
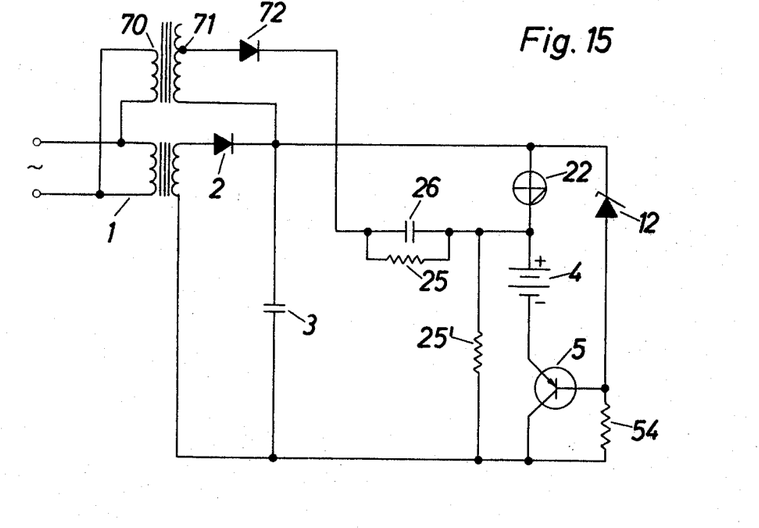

FIGURE 15 illustrates an embodiment of the present invention in which the means for producing the initial control voltage rendering semi-conductor 22 highly conductive include a voltage divider, for instance in form of a potentiometer 70 connected to the terminals of the primary winding of transformer 1 so as to be supplied with A.C. current. The wiping contact 71 of potentiometer 70 supplies the voltage to the R-C unit 25, 25′, 26 via a rectifier 72.

Figure 17:
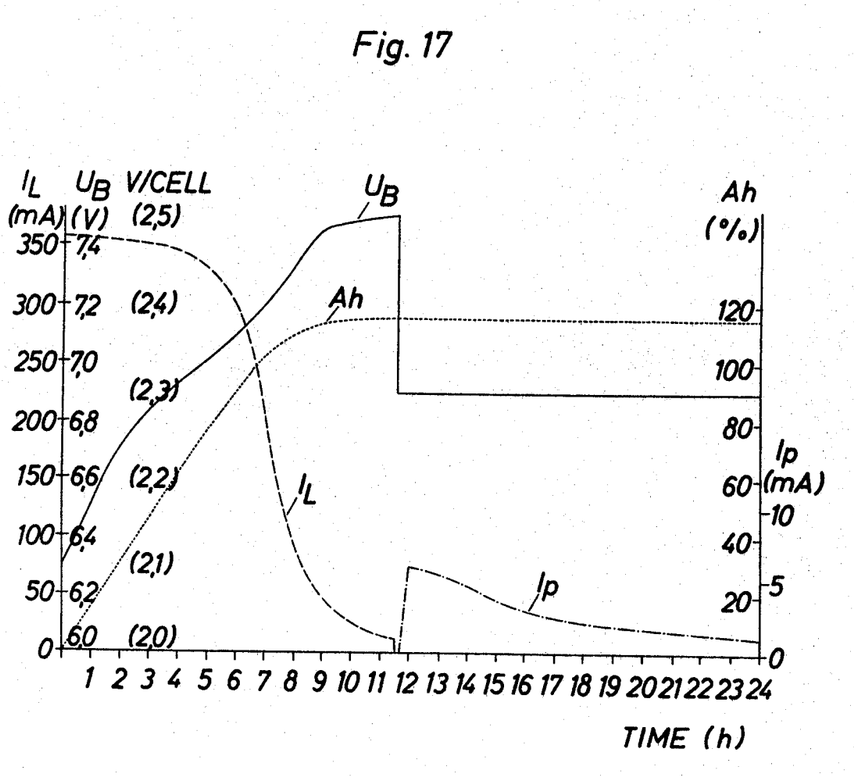
FIGURE 17 is a time chart showing the changes of the charging voltage, the charging current and the capacity of an accumulator occurring during a charging operation performed with the apparatus described hereinafter with reference to FIGURE 11.

FIGURE 17 is a time chart showing the changes of the charging voltage, the charging current and the capacity of the accumulator during the charging operation and thereafter. In this time chart the symbols used therein denote $I_L$—charging current in ma.
$U_B$—battery terminal voltage
V/cell—terminal voltage of a single cell
$A_h$—ampere hours of charge as a percentage of the nominal capacity, taking into account a charging factor (efficiency of 1.16.
$I_p$—float charge current in ma.
Time ($h$)—time in hours.

During the first stage comprising 4–5 hours recharging takes place in an uncontrolled manner at a current of about 350 ma. This current falls slightly due only to the increase of the battery E.M.F. The terminal voltage of the battery rises sharply and reaches, after about 5 hours, 7 volts, i.e. 2.33 volts per cell. Automatic control of the charging current now starts, since the Zener diode 12 in the charging circuit is now starting to work within its operating range.

After the second stage comprising a further 4 hours of charging, the terminal voltage has practically reached the nominal Zener voltage of the Zener diode. Further increases of potential occur very slowly and the rated value of 2.5 volts per cell, i.e. 7.5 volts for a battery of three cells, is reached after a total charging time of 11½ hours. The first of the two electrical conditions has now been satisfied.

During the second stage the charging current has dropped continuously down to that predetermined low value of current at which switching off or over occurs, and which is just sufficient to safely provide the required terminal potential of 2.5 volts per cell. The second required condition has now also been satisfied. At this moment switching off or, as is shown in the graphs, switching over to a constant float charge of 2.3 volts per cell, that is 6.9 volts for the 6 volt battery, occurs automatically. Since the potential of 2.5 volts per cell impressed on the battery can only fall slowly, over a period of some seconds, to 2.3 volts per cell, whilst the charger changes to this value instantaneously. The charging current drops to zero for a short while and appears then as current for the float charge $I_P$ of approximately 6 ma. The charging current has been shown to a larger scale and the values of current $I_P$ shown on the right hand side of the graph apply.

The behaviour of the float charge current during the next 12 hours makes it clear that it is the float charge potential of 2.3 volts per cell which is predetermined and not the current. Depending on the state of the individual cells and the age of the battery a current, which can vary between some 100 μa. and about 10 ma., will flow.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What is claimed is:

1. Apparatus for charging an electrical accumulator, comprising a source of direct current, a pair of terminals, an electrical circuit for supplying charging current from said source to an accumulator, when the latter is connected across said terminals, a resistor included in said circuit, a bistable device connected across said resistor, a transistor having its emitter and its collector included in said circuit for controlling the charging current flowing through said circuit, the base of said transistor being connected to said bistable device, and a condenser connected to said circuit in parallel with said emitter and collector to temporarily by-pass said transistor and to initiate flow of charging current through said resistor when said accumulator is connected to said source, said bistable device being responsive to the magnitude of charging current to cause said transistor to conduct, when the magnitude of said charging current is above a predetermined low limit, and to cut off said transistor, when the magnitude of said charging current is below said predetermined low limit.

2. Apparatus as claimed in claim 1, further comprising a potential adjusting device connected to said circuit to be responsive to the potential across said terminals, said device being so connected with the base of said transistor as to adjust said potential to maintain a predetermined constant maximum potential difference between said terminals, when said charging current approaches said predetermined low limit.

3. Apparatus as claimed in claim 2 in which said potential-adjusting device is a Zener diode.

4. Apparatus as claimed in claim 2 in which said potential-adjusting device comprises a plurality of rectifier diodes arranged in series so as to by-pass said pair of terminals when the voltage applied to the positive one of said terminals exceeds the forward conducting voltage of said rectifiers.

5. Apparatus for charging an electrical accumulator, comprising a source of direct current, a pair of terminals, an electrical circuit for supplying charging current from said source to an accumulator, when the latter is connected across said terminals, a resistor included in said circuit, a bistable device connected across said resistor, a transistor having its emitter and its collector included in said circuit for controlling the charging current flowing through said circuit, the base of said transistor being connected to said bistable device, and a condenser connected to said circuit to temporarily by-pass said transistor and to initiate flow of charging current through said resistor when said accumulator is connected to said source, said bistable device being responsive to the magnitude of charging current to cause said transistor to conduct, when the magnitude of said charging current is above a predetermined low limit, and to cut off said transistor, when the magnitude of said charging current is below said predetermined low limit, a Zener diode connected to said circuit to be responsive to the potential across said terminals, said device being so connected with the base of said transistor as to adjust said potential to maintain a predetermined constant maximum potential difference between said terminals, when said charging current approaches said predetermined low limit, said Zener diode connecting one of said terminals with the base of said transistor, the emitter of said transistor being connected with the other one of said terminals, said apparatus further including a resistor connected between said base and the collector of said transistor and having a conductivity high enough to be operative in co-operation with said Zener diode to conduct a current sufficient to bring said bistable device into the condition rendering said transistor conductive.

6. Apparatus for charging an electrical accumulator, comprising
a source of unidirectional charging current,
a pair of terminals for connection to the accumulator,
an electrical circuit for supplying charging current from said source through said terminals when the accumulator is connected to said terminals,
a current-absorbing device connected to said circuit in series with said accumulator,
a three-electrode electronic device having two electrodes thereof connected in said circuit in series with said accumulator and in parallel with said current absorbing device,
means initially restricting flow of the charging current through said electronic device and causing said charging current to flow through said current absorbing device,
said means rendering said electronic device operative to permit flow of current through said accumulator when said current-absorbing device absorbs a maximum of current,
said means responsive to a predetermined decrease of said charging current for abruptly and drastically reducing the conductivity of said electronic device when said accumulator approaches fully-charged condition, and
control means controlling the flow of current through the third electrode of said electronic means, when the accumulator approaches fully-charged condition, to restrict the current passing through said terminals to a value ensuring maintenance of a predetermined constant maximum voltage between said terminals.

7. Apparatus as defined in claim 6, wherein said current-absorbing device is a condenser.

8. Apparatus as claimed in claim 6, wherein said means for abruptly and drastically reducing the charging current includes a bistable device and said electronic device is a transistor for conducting current through the accumulator when the bistable device is in a first state, and
means for reducing the conductivity of the bistable device as the charge in the accumulator increases, thereby to reduce the charging voltage.

9. Apparatus as claimed in claim 8, having means operative when the bistable device no longer remains in its first state, for applying voltage to the base of the transistor abruptly to increase the resistance to charging of the accumulator and cutting off the charging current.

10. Apparatus as claimed in claim 8 wherein said bistable device comprises second and third transistors, said second transistor has its emitter connected in the circuit and its collector connected to the base of the third transistor and to a resistor which is connected to the collector of the first-named transistor, a resistor is disposed in the circuit between the emitter and the base of said second transistor, the emitter of said third transistor is connected to the circuit between a resistor and the accumulator, the collector of said third transistor is connected to the base of said first-named transistor, a Zener diode is connected between the base of the first transistor and between said resistor and the accumulator, a resistor connects the base and collector of said first transistor.

11. Apparatus for charging an electrical accumulator comprising
a source of unidirectional charging current,
a pair of terminals for connection to the accumulator,
an electrical circuit for supplying charging current from said source through said terminals when the accumulator is connected to said terminals, electronic means including a semi-conductor having a continuously variable resistance connected in series with said accumulator, and
means responsive to decrease of the charging current below a predetermined limit to produce a control voltage which abruptly increases said resistance to a point where said semi-conductor is rendered essentially nonconductive, and a condenser connected to said circuit in shunt to said electronic means, which is temporarily operative upon initial application of said charging current to said terminals to by-pass said semi-conductor thereby to initiate a current in said circuit.

12. Apparatus as claimed in claim 11 wherein said semiconductor is a transistor, and said control means include a Zener diode.

References Cited
UNITED STATES PATENTS

| | | | |
|---|---|---|---|
| 3,018,432 | 1/1962 | Palmer | 320—39 |
| 3,020,491 | 2/1962 | Kurtz | 331—113 |
| 3,069,616 | 12/1962 | Curtis | 322—25 |
| 3,109,981 | 11/1963 | Muchnick | 317—33 |
| 3,179,871 | 4/1965 | Bagno | 320—30 |
| 3,201,681 | 8/1965 | Van Wilgen et al. | 323—20 |
| 3,201,682 | 8/1965 | Johnson | 323—22 |
| 3,289,098 | 11/1966 | Cannalte | 331—62 |

LEE T. HIX, *Primary Examiner.*

S. M. WEINBERG, *Assistant Examiner.*